United States Patent
Yamamoto

[11] Patent Number: 5,398,964
[45] Date of Patent: Mar. 21, 1995

[54] STARTING DEVICE FOR AIR BAG

[75] Inventor: Ryutaro Yamamoto, Aichi, Japan

[73] Assignee: Kabushiki Kaisha Tokai-Rika-Denki-Seisakusho, Aichi, Japan

[21] Appl. No.: 141,745

[22] Filed: Oct. 27, 1993

[30] Foreign Application Priority Data

Oct. 27, 1992 [JP] Japan ............................. 4-074788 U

[51] Int. Cl.⁶ ............................................. B60R 21/32
[52] U.S. Cl. ............................. 280/734; 200/61.45 R
[58] Field of Search ............... 280/806, 734; 180/282; 297/480; 200/61.45 R, 61.53

[56] References Cited

U.S. PATENT DOCUMENTS 5,217,252  6/1993  Kawaguchi et al. ............... 280/731

FOREIGN PATENT DOCUMENTS 0417670  3/1991  European Pat. Off. .
3-100554  6/1991  Japan .
4-113957  4/1992  Japan .

*Primary Examiner*—Margaret A. Focarino
*Assistant Examiner*—Paul N. Dickson
*Attorney, Agent, or Firm*—Fisher & Associates

[57] ABSTRACT

A starting device for an air bag includes a mass body, a drive shaft and an ignition pin. The mass body detects a rapid deceleration of a vehicle by inertial movement of the mass body. An end portion of the mass body in the direction of inertial movement contacts a vicinity of one end portion of the drive shaft in a longitudinal direction thereof. The drive shaft is urged by an urging member and holds the mass body at a predetermined position due to urging force of the urging member. The drive shaft has an engaging member at a portion of the drive shaft in the longitudinal direction thereof, and is provided so as to be rotatable around the engaging member by the inertial movement of the mass body. The ignition pin includes a shaft member and a stepped collar member, the stepped collar member being formed at a portion of the shaft member in the longitudinal direction thereof. A relief portion is formed at the stepped collar member at a position corresponding to an abutting portion of the stepped collar member so as to prevent a tip end portion of the engaging member from abutting the abutting portion.

20 Claims, 4 Drawing Sheets

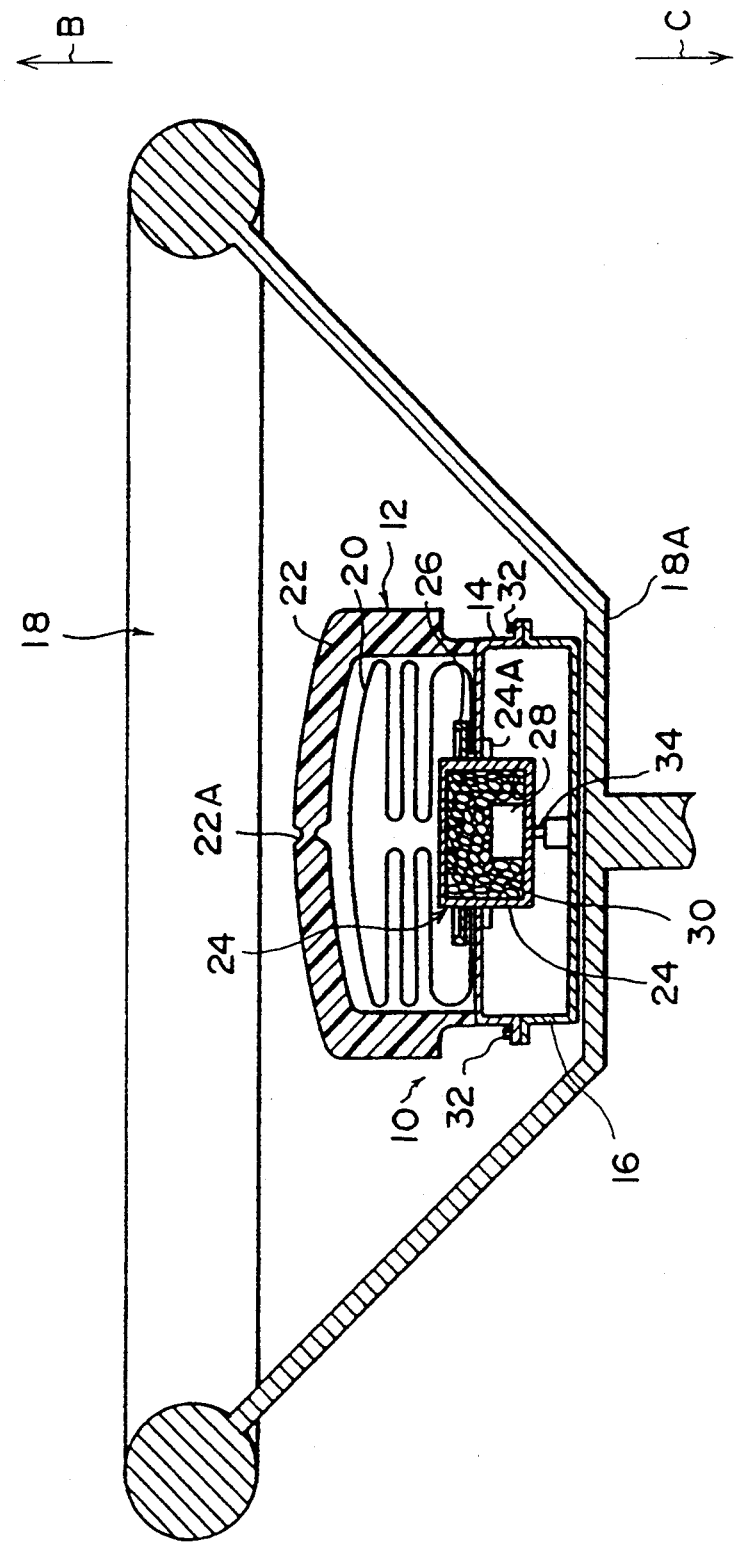

STARTING DEVICE FOR AIR BAG

BACKGROUND OF THE INVENTION

1. Field of the Invention

The present invention relates to a starting device for an air bag, and more particularly to a starting device which expands an air bag mounted to a vehicle to protect an occupant.

2. Description of the Related Art

An air bag is provided with a starting device for an air bag apparatus of a type which is mounted to a steering wheel, for example, this starting device expands the air bag when a vehicle rapidly decelerates or the like. The expanded air bag is then disposed between the steering wheel and an occupant.

for a starting device of this type, a drive shaft, which is rotatably provided within a case for the starting device, is rotated in accordance with an amount of inertial movement of a mass body upon a rapid deceleration of the vehicle. (A ball is generally used for the mass body.) Engagement between an engaging member (i.e., a triggering portion) provided at the drive shaft and an ignition pin is either released or unreleased. A mechanical starting device disclosed in Japanese Patent Application Laid-Open Nos. 60-248454, 60-248455, 60-248456, and 60-248457 is relatively popular. In accordance with the above-described released and unreleased states, the starting device switches from a state of blocking movement of the ignition pin urged in the direction of a detonator to a state in which the starting device does not block movement of the ignition pin.

for a starting device of this type, a circular arc portion is formed at a tip end portion of the engaging member of the drive shaft. The tip end portion is provided in the vicinity of a portion engaging the ignition pin. The dimensional accuracy of radius R of this circular arc must be extremely high so that the drive shaft can rotate smoothly at a predetermined timing when a predetermined inertial force is applied to a ball upon rapid deceleration of the vehicle.

According to the construction of the above-described prior art, an engaging member provided at the drive shaft and the ignition pin are engaged through a stepped collar portion provided at the ignition pin. When the movement of the ignition pin is blocked, the tip end portion of the engaging member remains in pressing contact against an outer peripheral surface of the stepped collar portion. As a result, the tip end portion becomes worn and changes shape by the vibrations or the like of the vehicle during a normal operation. Consequently, there is a possibility of failing to maintain the accuracy of the above-described radius R.

To solve this problem and to strengthen abrasion resistance of the tip end portion of the engaging member, it was necessary to take some special measures, such as abrasion resistance treatment and abrasion resistance machining. Such treatment and machining, however, increased the cost of a starting device.

SUMMARY OF THE INVENTION

In view of the problems set forth above, it is an object of the present invention to provide a starting device for an air bag which can prevent the tip end portion of the engaging member of a drive shaft from changing shape when the movement of an ignition pin is blocked, without taking special measures such as abrasion resistance treatment. It is another object of the present invention to provide a starting device for an air bag at a reduced cost.

According to the present invention, a starting device for an air bag comprising: a mass body for detecting a rapid deceleration of a vehicle by inertial movement of the mass body; a drive shaft, an end portion of the mass body in a direction of inertial movement thereof contacting a vicinity of one end portion of the drive shaft in a longitudinal direction thereof, the drive shaft being urged by urging means and holding the mass body at a predetermined position due to urging force of the urging means, the drive shaft having an engaging member at a portion of the drive shaft in the longitudinal direction thereof, and being provided so as to be rotatable around the engaging member due to the inertial movement of the mass body; and, an ignition pin including a shaft member and a stepped collar member, the stepped collar member being formed at a portion of the shaft member in the longitudinal direction thereof, a relief portion being formed at the stepped collar member at a position corresponding to an abutting portion of the stepped collar member so as to prevent a tip end portion of the engaging member from abutting the abutting portion, and in a normal state of the vehicle, movement of the ignition pin is prevented by engagement of the engaging member and the stepped collar member, and when the vehicle rapidly decelerates, engagement of the engaging member and the stepped collar member is released by rotation of the drive shaft caused by the inertial movement of the mass body, and due to release of the engagement, the ignition pin moves along a predetermined guide path and actuates a detonator so as to expand an air bag.

According to the structure as set forth above, when a vehicle rapidly decelerates, the inertial body inertially moves so as to oppose the urging force of a urging means. The drive shaft rotates by a large amount. As a result, an engaged state between the engaging member of the drive shaft and the stepped collar member of the ignition pin is released. The ignition pin moves along the predetermined guide paths and actuates the detonator so as to expand the air bag. As a result, an occupant is protected during impact caused by a rapid deceleration of a vehicle.

When a vehicle runs in a normal condition, the engaging member provided at the drive shaft engages a stepped collar member of the ignition pin, thereby blocking the movement of the ignition pin. At this time, the tip end portion of the engaging member of the drive shaft is prevented from pressing and contacting the stepped collar member of the ignition pin because of the function of the relief portion.

Therefore, the tip end portion of the engaging member of the drive shaft is prevented from changing shape due to abrasion. Abrasion is created, during normal operation of a vehicle, by contact with the stepped collar member or the like as a result of vibrations or the like of the vehicle.

According to the present invention as described above, when movement of the ignition pin is blocked, the tip end portion of the engaging member of the drive shaft is prevented from pressing and contacting the stepped collar member of the ignition pin because of the function of the relief portion. Therefore, the tip end portion of the engaging member of the drive shaft can be prevented from changing shape by abrasion. As a result, without taking special measures such as abrasion resistance treatment, the present invention achieves a more practical effect in that the tip end portion of the engaging member of the drive shaft can be prevented from changing shape and that the cost of the starting device can be reduced.

BRIEF DESCRIPTION OF THE DRAWINGS

FIG. 4 is a schematic cross-sectional view, showing a state of an air bag apparatus with a starting device being mounted to a steering wheel.

DESCRIPTION OF THE PREFERRED EMBODIMENTS

Figure 1:
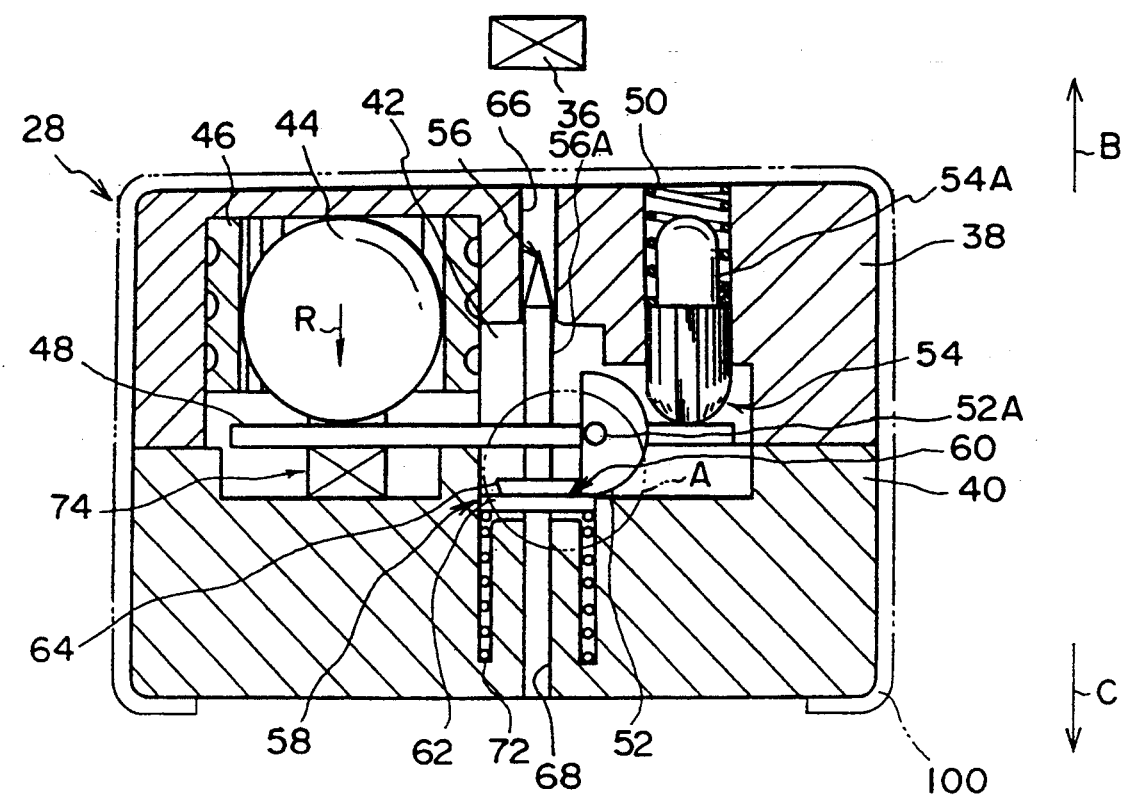
FIG. 1 is a schematic cross-sectional view of a starting device according to the present invention.

A description will now be given of one embodiment of the present invention with reference to FIGS. 1 to 4.

FIG. 4 shows a schematic cross-sectional view, illustrating a state in which an air bag apparatus 10 with an example of a starting device for an air bag of the present invention is mounted to a steering wheel 18.

A main body 12 of the air bag apparatus 10 can be mounted to the steering wheel 18 by securing a base plate 14 to a supporting plate 16 with bolts 32 or the like. The supporting plate is fixed to a hub 18A of the steering wheel 18.

A release pin 34 projects from a substantially central portion of the supporting plate 16. The location of the release pin 34 corresponds to that of a starting device for the air bag described hereinafter. This release pin 34 releases the operation of a locking device described hereinafter.

An air bag body 20, an air bag cover 22 and an inflator 24 are mounted to the base plate 14.

An air bag body 20 is folded on the occupant side of the base plate 14 (i.e., on the side of the direction shown by the arrow marked B in FIG. 4). An edge portion of the air bag body 20 on the opening side is mounted to a substantially central portion of the base plate 14 through a ring plate 26. The ring plate 26 is clamped to the base plate 14 by unillustrated bolts, and presses the edge portion of the opening side of the air bag body 20 to the base plate 14.

The air bag cover 22 is provided on the occupant side of the base plate 14 (i.e., on the side of the direction shown by the arrow marked B in FIG. 4) and accommodates the air bag body 20 between the cover 22 and the base plate 14. An unillustrated frame-shaped core is embedded in a periphery of the air bag cover 22. The air bag cover 22 is thus mounted to the base plate 14 via the core by rivets or the like. In addition, a thin-walled portion 22A is formed on the air bag cover 22 at a portion facing an inflator 24 of the air bag cover 22. This thin-walled portion 22A is provided so that the cover 22 is easily ruptured.

The inflator 24 is substantially cylindrical, and is arranged to pass through a circular hole provided in the central portion of the base plate 14. A portion of the inflator 24 is inserted into the air bag body 20. The flange 24A of the inflator 24 is mounted to the surface of the base plate 14 on the side opposite the occupant (i.e., on the side of the direction shown by the arrow marked C in FIG. 4).

In addition, a gas generating material 30 is provided inside the inflator 24, the combustion of the gas generating material 30 is started by a cylindrical air bag starting device 28 (hereinafter, referred to as a "starting device"). The gas generating material 30 generates a large amount of gas due to chemical decomposition by combustion. Having passed through an unillustrated filter, the gas expands the air bag body 20. An example of the gas generating material 30 is sodium azide.

Both a detonator 36 (see FIG. 1), which is separately provided from the gas generating material 30, and an unillustrated booster are arranged coaxially with the starting device 28. When the detonator 36 is ignited, sparks are guided to the booster and converted into heat energy, thereby generating a large amount of gas.

In addition, the starting device 28, which ignites the detonator 36, is arranged in a center portion in the inflator 24. A description will now be given of this starting device 28.

As shown in FIG. 1, the starting device 28 is divided into an upper case 38 and a lower case 40, which are separated by a surface perpendicular to a axis at a substantially central portion of the axis in the longitudinal direction. Further, an accommodating portion 42 is formed in a space surrounded by end surfaces of the upper case 38 and the lower case 40.

An inertial body of a mechanical air bag sensor is a ball 44 which, as a mass body, detects a rapid deceleration of a vehicle by inertial movement. Inside the upper case 38, two balls (only one of them is illustrated in FIG. 1) are arranged symmetrically around the axial center of the upper case 38. A description will be given of one ball because each ball 44 and associated parts are disposed symmetrically in a pair around the axial center of the upper case 38.

The ball 44 is inserted into a cylinder 46 provided in the upper case 38. The cylinder 46 is provided and secured so that the axis of the cylinder 46 is in parallel with that of the upper case 38. Accordingly, when a rapid acceleration acts on the ball 44, the ball 44 is disposed so as to inertially move towards the lower case 40 (i.e., in the direction shown by the arrow marked R) in the cylinder 46.

A substantially shaft-shaped drive shaft 48 is disposed in the accommodating portion 42 along the vicinity of the border between the upper case 38 and the lower case 40. One longitudinal end portion 48A (see FIG. 3) of the drive shaft 48 contacts with the ball 44, at the end portion on the side of the lower case 40 (i.e., in the direction shown by the arrow marked R), by an urging force of a bias spring 50.

Figure 3:
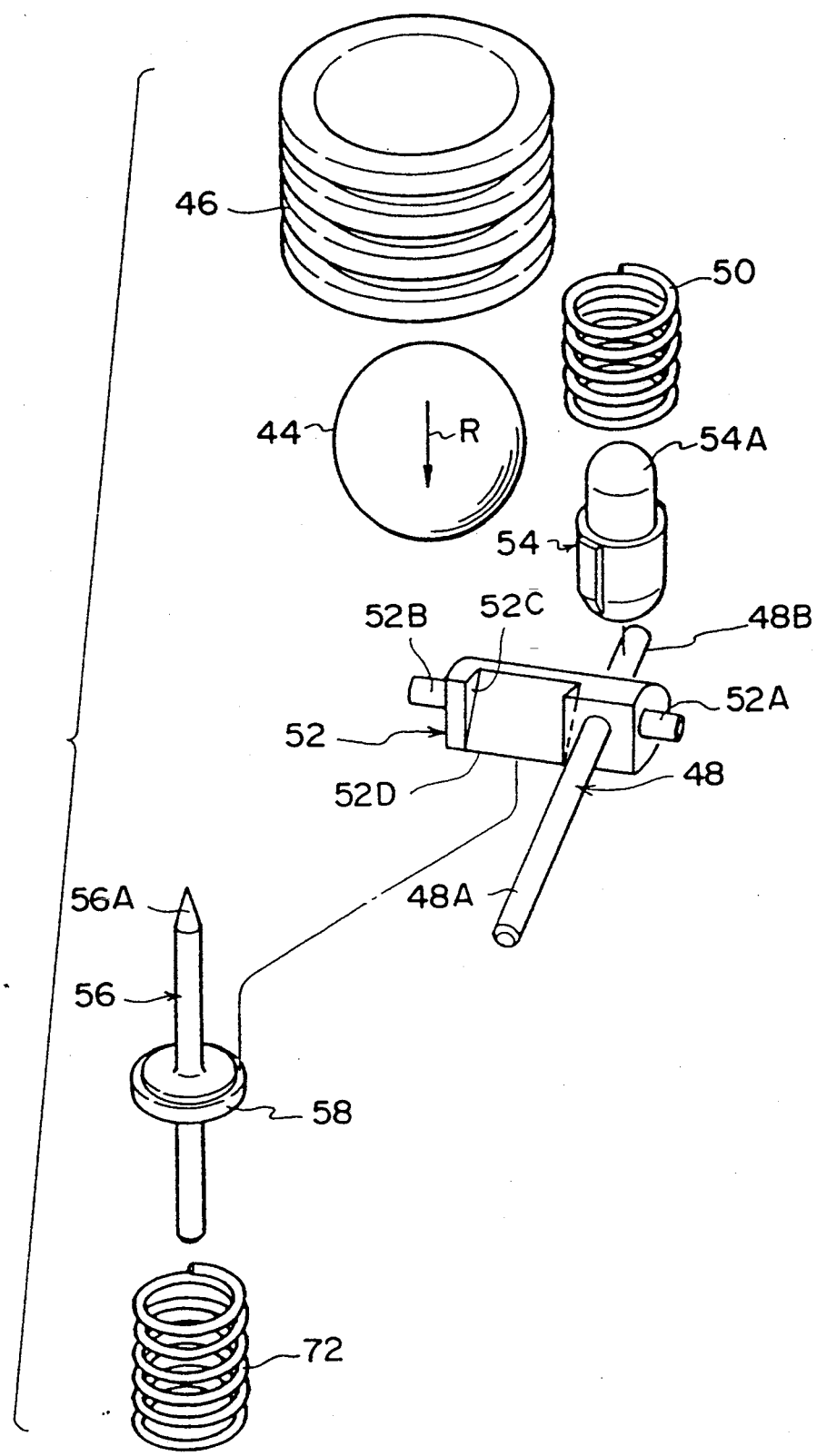
FIG. 3 is an exploded perspective view of main components of FIG. 1.

As shown in FIG. 3, an engaging member 52 is a bar-shaped member with a substantially semicircular cross section, and is disposed at an central portion of the drive shaft 48 in the longitudinal direction. The engaging member 52 is mounted so that the engaging member 52 in the longitudinal direction is perpendicular to the drive shaft 48 in the axial direction. The drive shaft 48 is axially supported by both the upper case 38 and the lower case 40 via a pair of rotation axes 52A and 52B, which are disposed at the ends of the engaging member 52. Thus, the drive shaft 48 is rotatably provided around the rotational axes 52A and 52B. A bias pin 54 is provided in the upper case 38 so as to be parallel to the axial direction thereof and is urged in the direction of the lower case 40 by the operation of the bias spring 50 serving as a spring means. The other end portion 48B (see FIG.3) of the drive shaft 48 is in pressing contact with the end portion of the bias pin 54 on the side of the lower case 40 (i.e., in the direction shown by the arrow marked C in FIG. 1). As a result, one end portion 48A of the drive shaft 48 contacts the ball 44 due to the urging force of the bias spring 50.

Note that one tip end portion of the engaging member 52 of the drive shaft 48 (i.e., the end portion in the direction shown by the arrow marked C in FIG. 1) is formed with a circular arc portion 52D and that a dimensional accuracy of a radius R of this circular arc is made so that the drive shaft 48 can smoothly rotate at a predetermined timing when a predetermined inertial force acts on the ball 44 at the time of rapid deceleration of the vehicle. In addition, as shown in FIG. 3, a concave portion 52C is formed on the surface of the engaging member 52 which faces an ignition pin 56 so that the ignition pin 56 will not make contact with the engaging member 52 when the ignition pin 56 moves. A description of the ignition pin 56 will be given later.

A smaller diameter portion 54A (see FIG. 3) is formed from a substantially intermediate portion of the bias pin 54 in the longitudinal direction toward the side of the air bag body 20 (i.e., in the direction shown by the arrow marked B in FIG. 1). The bias spring 50 is wound around this smaller diameter portion 54A. The end portion of the bias spring 50 on the side of the air bag body 20 (i.e., the end portion in the direction shown by the arrow marked B in FIG. 1) contacts an outside cover 100 (see FIG. 1). The cover 100 encloses the upper case 38 and the lower case 40.

Further, as shown in FIG. 1, the ignition pin 56 consists of a shaft portion 56A and a stepped collar portion 58. The stepped collar portion 58 is provided at an central portion of the shaft portion 56A in the longitudinal direction. One tip end portion of the engaging member 52 (i.e., the end portion in the direction shown by the arrow marked C in FIG. 1) engages a step portion 60 of the stepped collar portion 58 of the ignition pin 56. This stepped collar portion 58 consists of a first disc-shaped portion 62 and a second disc-shaped portion 64. The second disc-shaped portion 64 is coaxially provided with the tip end side of the first disc-shaped portion 62 in the axial direction, and has more or less a smaller radius than the first disc-shaped portion 62. The step portion 60 is formed between the first and the second disc-shaped portions 62 and 64.

Figure 2:
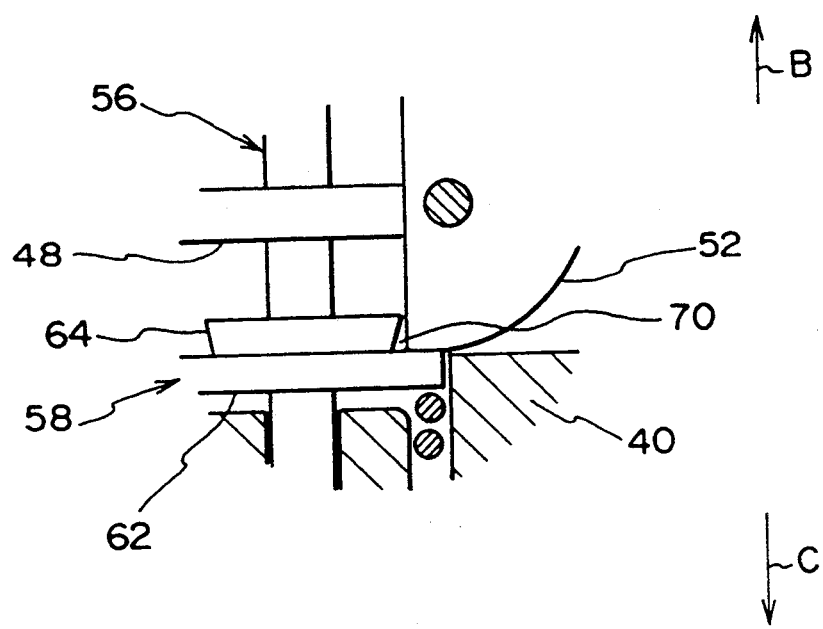
FIG. 2 is an enlarged view of a portion within a circle A of FIG. 1.

As shown in FIGS. 1 to 2, according to the present embodiment, a taper is formed on the outer-peripheral surface of the second disc-shaped portion 64. Therefore, when the movement of the ignition pin 56 in FIG. 1 is blocked, a relief portion 70 (see FIG. 2) is formed between the tip end portion of the engaging member 52 and the second disc-shaped portion 64 so as to prevent the tip end portion of the engaging member 52 from contacting the second disc-shaped portion 64.

As shown in FIG. 1, the ignition pin 56 is accommodated in the accommodating portion 42. The pin 56 is movably provided between the upper case 38 and tile lower case 40 along guide paths 66 and 68 when a vehicle rapidly decelerates. The guide paths 66 and 68 are respectively formed in the axial direction of the upper case 38 and the lower case 40.

In addition, a compression coil spring 72 is wound about the ignition pin 56 at a portion on the side shown by the arrow marked C in FIG. 1 with regard to a surface of the stepped collar portion 58 on the side of the lower case 40. As a result, the ignition pin 56 is pressed and urged in the direction towards detonator 36.

A locking device 74 is accommodated in the accommodating portion 42 on the side of the lower case 40 in the moving direction of a ball 44 (i.e., in the direction shown by the arrow marked R in FIG. 1). This locking device 74 prevents the ignition pin 56 from moving by regulating rotation of the drive shaft 48 when the starting device 28 is not actuated. In practice, the locking device 74 consists of an unillustrated torsion coil spring and an unillustrated lock pin. The lock pin can freely fit with one extended portion of the torsion coil spring. It is impossible to rotate the drive shaft 48 when this locking device 74 is actuated.

A description will now be given of the operation of the present embodiment.

Assume that the locking device 74 is released when the air bag apparatus main body 12 is installed in the vehicle.

During the normal operation, when a vehicle normally decelerates, the ball 44 inertially moves in accordance with the degree of deceleration in the direction shown by the arrow marked R in FIG. 1. Consequently, the drive shaft 48 pivots slightly counterclockwise around the rotation axes 52A and 52B in FIG. 1. However, the engaging member 52 of the drive shaft 48 will not be released from the stepped collar portion 58 of the ignition pin 56 in such a normal deceleration state since the urging force of the bias spring 50 applied to the bias pin 54 is greater than the inertial force applied to the ball 44.

The inertial force applied to the ball 44 is considerably greater when a vehicle rapidly decelerates than during normal deceleration. Therefore, the inertial movement of the ball 44 is large in the direction shown by the arrow marked R in FIG. 1 in order to oppose the urging force of the bias spring 50 applied to the bias pin 54. When the vehicle rapidly decelerates, the drive shaft 48 pivots counterclockwise around the rotation axes 52A and 52B to a greater degree than the drive shaft 48 pivots during normal operation. Therefore, the engaging member 52 of the drive shaft 48 will be released from the stepped collar portion 58 of the ignition pin 56. As a result, the ignition pin 56 moves along the guide paths 66 and 68 by the urging force of the compression coil spring 72 in the direction of the detonator 36, i.e., in the direction from the lower case 40 to the upper case 38.

The moved ignition pin 56 strikes and ignites a detonator 36. The sparks are converted into thermal energy by a booster (not shown), so as to cause a gas generating material 30 to react. A large amount of gas, which is generated by the gas generating material 30, passes through a filter (not shown). The gas is then guided into the air bag body 20 so as to be expanded.

The expanded air bag body 20 is interposed between an occupant and a steering wheel 18 so as to effectively protect the occupant from impact at the time of a rapid deceleration of the vehicle.

In the present embodiment, as shown in FIG. 2, a relief portion 70 is formed between a tip end of the engaging member 52 and a step portion 60 of the stepped collar 58 when the movement of the ignition pin 56 shown in FIG. 1 is blocked. Therefore, the tip end portion of the engaging member 52 is prevented from contacting with the second disc-shaped portion 64 for this reason, in the present embodiment, the tip end portion of the engaging member 52 of the drive shaft 48 can be effectively prevented from changing shape due to wear which, in the normal operation of the vehicle, is caused by vibrations or the like of a vehicle body. As a result, it is possible to maintain the accuracy of the aforementioned radius R at the tip end portion of the engaging member 52.

Accordingly, the present invention achieves a superior effect in that, without taking such special measures as abrasion resistance treatment, the tip end portion of the engaging member 52 of the drive shaft 48 can be effectively prevented from changing shape when the movement of the ignition pin 56 is blocked and that the cost of the air bag apparatus 10 can be reduced.

In the above-described embodiment, the relief portion 70 is formed by tapering the outer-periphery of the second disc-shaped portion 64 of the stepped collar portion 58. Thus, the tip end portion of the engaging member 52 is prevented from contacting the stepped collar portion 58 when the movement of the ignition pin 56 is blocked. However, the relief portion 70 may be constructed, for example, by cutting off a part of the stepped collar portion, which corresponds with the tip end portion of the engaging member.

What is claimed is:

1. A starting device for an air bag comprising:
    a mass body for detecting a rapid deceleration of a vehicle by inertial movement of said mass body;
    a drive shaft, an end portion of said mass body in a direction of inertial movement thereof contacting a vicinity of one end portion of said drive shaft in a longitudinal direction thereof, said drive shaft being urged by urging means and holding said mass body at a predetermined position due to urging force of said urging means, said drive shaft having an engaging member at a portion of said drive shaft in the longitudinal direction thereof, and being provided so as to be rotatable around said engaging member due to the inertial movement of said mass body; and
    an ignition pin including a shaft member and a stepped collar member, said stepped collar member being formed at a portion of said shaft member in the longitudinal direction thereof and including a first portion having a surface and a second portion, a tip end portion of said engaging member engaging said surface, and a relief portion being formed in said second portion so as to prevent said tip end portion of said engaging member from contacting said second portion, and in a normal state of the vehicle, movement of said ignition pin is prevented by engagement of said engaging member and said stepped collar member, and when the vehicle rapidly decelerates, engagement of said engaging member and said stepped collar member is released by rotation of said drive shaft caused by the inertial movement of said mass body, and due to release of the engagement, said ignition pin moves along a predetermined guide path and actuates a detonator so as to expand an air bag.

2. A starting device for an air bag according to claim 1, wherein said first portion is a first collar portion coaxially provided with said shaft member, and said second portion is a second collar portion provided so that a distance between an axial center of said second collar portion and a peripheral surface thereof is made smaller than that of said first collar portion.

3. A starting device for an air bag according to claim 2, wherein said relief portion is provided at at least a portion of said peripheral surface of said second collar portion.

4. A starting device for an air bag according to claim 3, wherein said relief portion is a taper, a distance between said relief portion and said axial center decreasing towards a portion of said second collar portion which contacts said first collar portion.

5. A starting device for an air bag according to claim 2, wherein said first collar portion and said second collar portion are formed in a disc-shape.

6. A starting device for an air bag according to claim 1, wherein said urging means includes a spring means and a contacting member, said contacting member is urged by said spring means so as to contact said drive shaft.

7. A starting device for an air bag according to claim 1, wherein said shaft member and said stepped collar member are integrally formed.

8. A starting device for an air bag according to claim 1, wherein said engaging member is provided at a substantially intermediate portion of said drive shaft in the longitudinal direction thereof.

9. A starting device for an air bag according to claim 8, wherein said urging means is provided at a vicinity of the other end portion in the longitudinal direction of said drive shaft, the vicinity of said other end portion being located opposite the vicinity of said one end portion with respect to said engaging member in a longitudinal direction of said drive shaft, said vicinity of said one end portion contacting said mass body.

10. A starting device for an air bag comprising:
    a mass body for detecting a rapid deceleration of a vehicle by inertial movement of said mass body;
    a drive shaft, an end portion of said mass body in a direction of inertial movement thereof contacting a vicinity of one end portion of said drive shaft in a longitudinal direction thereof, said drive shaft being urged by spring means via a contacting member so as to abut said drive shaft and hold said mass body at a predetermined position due to urging force of said spring means, said drive shaft having an engaging member at a portion of said drive shaft in the longitudinal direction thereof, and being provided so as to be rotatable around said engaging member due to the inertial movement of said mass body; and
    an ignition pin including a shaft member, a first collar portion having a surface and provided coaxially with said shaft member at a portion of said shaft member in the longitudinal direction thereof, and a second collar portion provided coaxially with said shaft member and provided integrally with said first collar portion, and said second collar portion provided such that a distance between an axial center of said second collar portion and a peripheral surface thereof is smaller than a distance between an axial center of said first collar portion and a peripheral surface thereof, a tip end portion of said engaging member engaging said surface and a relief portion being formed in at least a portion of said peripheral surface of said second collar portion so as to prevent said tip end portion of said engaging member from contacting said second collar portion, and in a normal state of the vehicle, movement of said ignition pin is prevented by engagement of said engaging member and said first collar portion, and when the vehicle rapidly decelerates, engagement of said engaging member and said first collar portion is released by rotation of said drive shaft caused by the inertial movement of said mass body, and due to release of the engagement, said ignition pin moves along a predetermined guide path and actuates a detonator so as to expand an air bag.

11. A starting device for an air bag according to claim 10 wherein said relief portion is a taper a distance between said relief portion and said axial center decreasing towards a portion of said second collar portion which contacts said first collar portion.

12. A starting device for an air bag according to claim 10, wherein said first collar portion and said second collar portion are formed in a disc-shape.

13. A starting device for an air bag according to claim 10, wherein said shaft member and said stepped collar member are integrally formed.

14. A starting device for an air bag according to claim 10, wherein said engaging member is provided at a substantially intermediate portion of said drive shaft in the longitudinal direction thereof.

15. A starting device for an air bag according to claim 94, wherein said spring means is provided at a vicinity of the other end portion in the longitudinal said drive shaft, the vicinity of said other end portion being located opposite the vicinity of said one end portion with respect to said engaging member in a longitudinal direction of said drive shaft, said vicinity of said one end portion contacting said mass body.

16. A starting device for an air bag comprising:
a mass body for detecting a rapid deceleration of a vehicle by inertial movement of said mass body;
a drive shaft, an end portion of said mass body in a direction of inertial movement thereof contacting a vicinity of one end portion of said drive shaft in a longitudinal direction thereof, said drive shaft being urged by spring means via a contacting member so as to abut said drive shaft and hold said mass body at a predetermined position due to urging force of said spring means, said drive shaft having an engaging member at a portion of said drive shaft in the longitudinal direction thereof, and being provided so as to be rotatable around said engaging member due to the inertial movement of said mass body; and
an ignition pin including a shaft member, a disc-shaped first collar portion having a surface and provided coaxially with said shaft member at a portion of said shaft member in the longitudinal direction thereof, and a disc-shaped second collar portion provided coaxially with said shaft member and provided integrally with said first collar portion, and said second collar portion provided so that a distance between an axial center of said second collar portion and a peripheral surface thereof is smaller than a distance between an axial center of said first collar portion and a peripheral surface thereof, a tip end portion of said engaging member engaging said surface and a relief portion being formed at the entire peripheral surface of said second collar portion so as to prevent said tip end portion of said engaging member from contacting said second collar portion, and in a normal state of the vehicle, movement of said ignition pin is prevented by engagement of said engaging member and said first collar portion, and when the vehicle rapidly decelerates, engagement of said engaging member and said first collar portion is released by rotation of said drive shaft caused by the inertial movement of said mass body, and due to release of the engagement, said ignition pin moves along a predetermined guide path and actuates a detonator so as to expand an air bag.

17. A starting device for an air bag according to claim 16, wherein said relief portion is a taper, a distance between said relief portion and said axial center decreasing towards a portion of said second collar portion which contacts said first collar portion.

18. A starting device for an air bag according to claim 16, wherein said shaft member and said stepped collar member are integrally formed.

19. A starting device for an air bag according to claim 16, wherein said engaging member is provided at a substantially intermediate portion of said drive shaft in the longitudinal direction thereof.

20. A starting device for an air bag according to claim 19, wherein said spring means is provided at a vicinity of the other end portion in the longitudinal direction of said drive shaft, the vicinity of said other end portion being located opposite the vicinity of said one end portion with respect to said engaging member in a longitudinal direction of said drive shaft, said vicinity of said one end portion contacting said mass body.

* * * * *